United States Patent [19]
Yamanaka

[11] Patent Number: 6,031,562
[45] Date of Patent: Feb. 29, 2000

[54] IMAGE FORMING APPARATUS WITH ROTATIONAL SPEED CONTROLLER FOR AN IMAGE FORMING POLYHEDRAL MIRROR

[75] Inventor: Toshihisa Yamanaka, Toyokawa, Japan

[73] Assignee: Minolta Co., Ltd., Osaka, Japan

[21] Appl. No.: 08/838,694

[22] Filed: Apr. 9, 1997

[30] Foreign Application Priority Data

Apr. 11, 1996 [JP] Japan .................................. 8-115412

[51] Int. Cl.[7] ........................................................ B41J 2/47
[52] U.S. Cl. ................................................................ 347/261
[58] Field of Search .................................. 347/243, 259, 347/260, 261, 250; 318/652, 685; 358/494

[56] References Cited

U.S. PATENT DOCUMENTS

| | | | |
|---|---|---|---|
| 4,130,838 | 12/1978 | St. John | 358/412 |
| 4,872,065 | 10/1989 | Isono et al. | 358/494 |
| 5,412,302 | 5/1995 | Kido et al. | 318/685 |
| 5,677,724 | 10/1997 | Takizawa et al. | 347/250 |

*Primary Examiner*—N. Le
*Assistant Examiner*—Shih-Wen Hsieh
*Attorney, Agent, or Firm*—Sidley & Austin

[57] ABSTRACT

An image forming apparatus of the present invention outputs a laser beam used for image formation in accordance with image data, and reflects said beam by a rotatably driven polygonal mirror having polygonal prism-like lateral surfaces as the reflective surfaces so as to scan a charged surface of a photoconductive member in a main scanning direction and form an electrostatic latent image on said photoconductive member, said image forming apparatus comprising a photoemitter which emits a forced laser beam unrelated to image data before outputting a laser beam for image formation so as to adjust the output timing of said beam used for image formation, photoreceptor which detects the forced laser beam at a predetermined position directly before starting a main scanning of said photoconductive member, calculator which calculates the period of one rotation of said polygonal mirror based on the detection by said photoreceptor, and a controller which controls the rotational speed of said polygonal mirror based on the period of one rotation of said polygonal mirror calculated by said calculator.

18 Claims, 7 Drawing Sheets

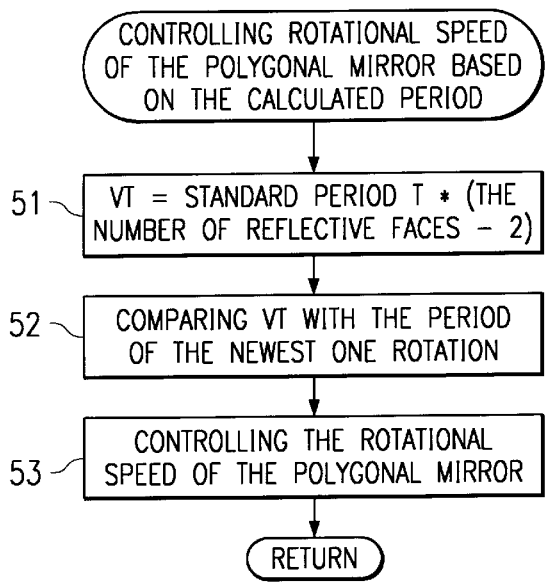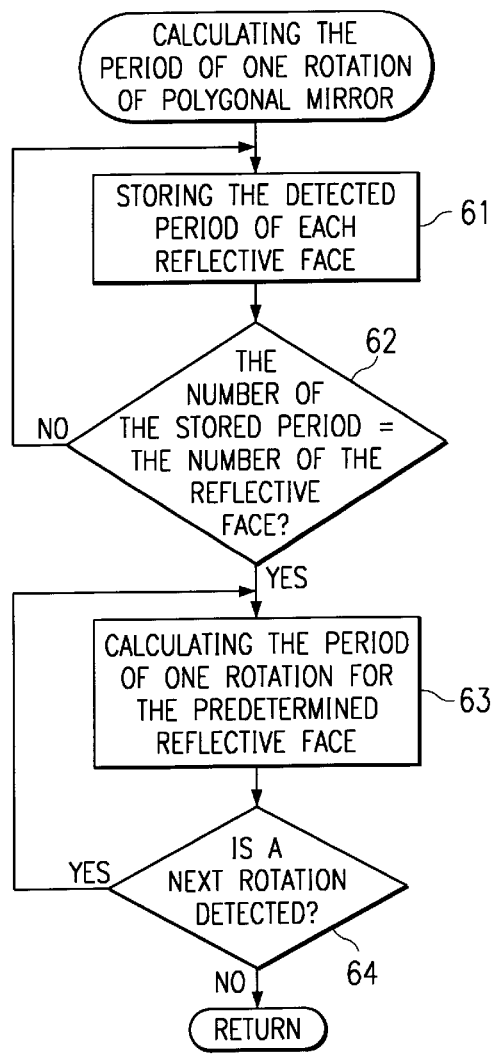

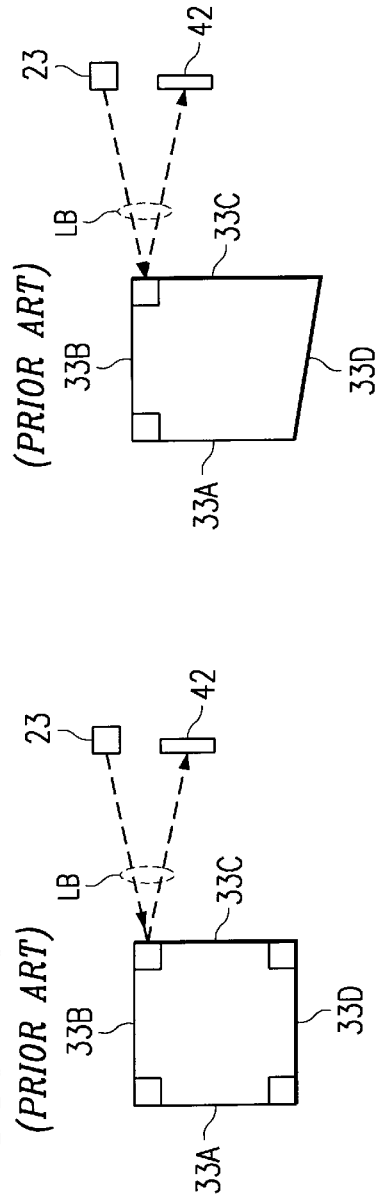
FIG. 10A
(PRIOR ART)
FIG. 10B
(PRIOR ART)
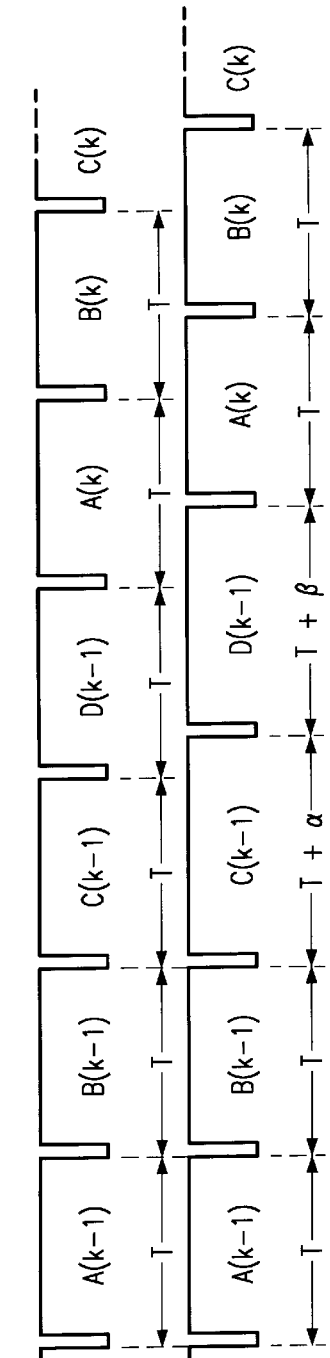
FIG. 10C
(PRIOR ART)
FIG. 10D
(PRIOR ART)

IMAGE FORMING APPARATUS WITH ROTATIONAL SPEED CONTROLLER FOR AN IMAGE FORMING POLYHEDRAL MIRROR

BACKGROUND OF THE INVENTION

The present invention relates to an image forming apparatus.

In conventional image forming apparatuses of the electrophotographic type such as laser printers, digital copiers, facsimile apparatuses and the like, it is known that a laser beam used for image formation is modulated and output in accordance with image data and reflected by a rotating polyhedral reflective mirror to scan a charged photoconductive member so as to form an electrostatic latent image on the surface of said photoconductive member. The aforesaid polyhedral reflective mirror has a reflective mirror formed so as to have regular polygonal prism-like lateral surfaces as the reflective faces, and is driven in rotation by a motor with the center axis of said polygonal prism as the rotational axis. This type of polyhedral reflective mirror is well known as, for example, a polygonal mirror.

In conventional image forming apparatuses, as shown in FIG. 9, a start-of-scan sensor 42 (hereinafter referred to as "SOS sensor 42") is provided as a photoreceptor sensor at a predetermined position directly in front of the position at which scanning of the photoconductive member starts. In such apparatuses, a laser beam unrelated to image data is forcibly output before scanning (hereinafter referred to as "forced laser beam") to control the output timing of the laser beam used for image formation and output in accordance with image data in the main scanning direction.

The forced laser beam forcibly output from laser diode 23 is reflected by reflective face 33D of polygonal mirror 33, and detected by SOS sensor 42. The output laser beam used for image formation scans the charged surface of the photoconductive member (not illustrated in FIG. 9) in accordance with said detection timing. The image forming laser beam scans the photoconductive member via the next reflective face 33A in accordance with the timing of the forced laser beam detected by SOS sensor 42 in the same manner as for reflective face 33D. The rotational speed of the polygonal mirror is controlled by controlling the voltage applied to drive motor 32 which rotates the polygonal mirror based on the detection of the forced laser beam by each reflective face.

The forced laser beam detection interval of SOS sensor 42, i.e., the time from the moment a forced laser beam reflected by reflective face 33D is detected by SOS sensor 42 until the detection of the next forced laser beam reflected by reflective face 33A (hereinafter referred to as "detection period"), is input to period comparator 112 and compared to a standard period output from standard period generator 111. The voltage applied to drive motor 32 via driver 311 is controlled by a voltage control calculator 113 based on the aforesaid comparison result so as to set the rotational speed of polygonal mirror 32 at a desired speed. That is, the period detected for each reflective face is fed back to adjust the rotational speed of the polygonal mirror 33.

There is concern of dispersion in the width of each reflective face of the polygonal mirror, the angle at which adjacent reflective faces are formed and the distance between each reflective face and the center of rotational axis of the polygonal mirror due to mounting errors of the installed devices and manufacturing errors of the polygonal mirror. When such errors occur, disadvantages arise in the control of the rotational speed of the polygonal mirror.

These disadvantages are described below.

FIG. 10A shows an absence of dispersion of the reflective faces of the polygonal mirror, and FIG. 10B shows a presence of dispersion of the reflective faces of the polygonal mirror. FIG. 10C shows a timing chart of the detection period of SOS sensor 42 in the absence of dispersion of the reflective faces, and FIG. 10D shows a timing chart of the detection period of SOS sensor 42 in the presence of dispersion of the reflective faces. As can be clearly understood from FIG. 10D, the period of detection by SOS sensor 42 in the presence of dispersion of the reflective faces differs from the constant period (standard period T) in the absence of dispersion of the reflective faces (refer to FIG. 10C). When, for example, the width of reflective face 33C is larger than the width of reflective face 33B as shown in FIG. 10B, the period C(K−1) (i.e., the transition from the falling edge B(k−1) to the falling edge C(k−1)) of reflective face 33C becomes [T+α]. That is, the period of reflective face 33C is longer than the period T of reflective face 33B by the value α. Similarly, period D(K−1) (i.e., the transition from the falling edge of C(k−1) to the falling edge of D(k−1)) of reflective face 33D is [t+β], and is longer than period T of reflective face 33B by the value β.

FIGS. 11A through 11C show the control of the rotational speed of the polygonal mirror in the absence of dispersion of the reflective faces, and FIGS. 11D and 11E show the control of the rotational speed of the polygonal mirror in the presence of dispersion of the reflective faces.

As shown in FIGS. 11A through 11C, when the rotational speed of polygonal mirror 33 is changed in the absence of dispersion of the reflective faces, e.g., when the period of reflective face 33A becomes [t+α], the rotational speed of the next reflective face 33B is adjusted so as to increase said speed by the value α. As a result, the period of reflective face 33B becomes [t]. Similarly, when the period of reflective face 33A becomes [t−α], the rotational speed of reflective face 33B is adjusted so as to decrease said speed by the value α, such that the period of reflective face 33B becomes [t]. In other words, in the absence of dispersion, the rotational speed of polygonal mirror 33 is adjusted to a desired speed by the aforesaid controls.

On the other hand, as shown in FIG. 11D and 11E, when the rotational speed of polygonal mirror 33 is not changed in the presence of dispersion of the reflective faces, e.g., when the period of reflective face 33A is [t+α], the aforesaid controls adjust the rotational speed of the next reflective face 33B so as to increase said speed by the value α. As a result, the period of reflective face 33B is shorter than the previous period by the value α. In the presence of dispersion of reflective face 33B, since the original period of reflective face 33B (i.e., the period of reflective face 33B when the rotational speed is adjusted to a desired speed) is [T+2α], when the aforesaid control executed, the speed is adjusted so as to increase said speed by the value α, such that the period of reflective face 33B becomes [T−3α]. That is, when the aforesaid control is executed in the presence of dispersion of the reflective face, the rotational speed of polygonal mirror 33 differs markedly from the desired speed.

SUMMARY OF THE INVENTION

The present invention eliminates the previously mentioned disadvantages by providing an image forming apparatus which outputs a laser beam used for image formation in accordance with image data, and reflects said beam by a rotatably driven polygonal mirror having polygonal prism-like lateral surfaces as the reflective surfaces so as to scan a charged surface of a photoconductive member in a main scanning direction and form an electrostatic latent image on said photoconductive member, said image forming apparatus comprising a photoemitter which emits a forced laser beam unrelated to image data before outputting a laser beam for image formation so as to adjust the output timing of said beam used for image formation, photoreceptor which detects the forced laser beam at a predetermined position directly before starting a main scanning of said photoconductive member, calculator which calculates the period of one rotation of said polygonal mirror based on the detection by said photoreceptor, and a controller which controls the rotational speed of said polygonal mirror based on the period of one rotation of said polygonal mirror calculated by said calculator.

The present invention minimizes the influence of dispersion of the reflective faces by adding the period of each reflective face of the polygonal mirror to calculate the rotational speed, i.e., by controlling the rotational speed of the polygonal mirror based on the period of one rotation of the polygonal mirror.

In the present invention, the aforesaid calculator calculates an average value for each reflective face of the newest period of one rotation of said polygonal mirror. The aforesaid controller controls the rotational speed of the polygonal mirror based on said average value.

Furthermore, the aforesaid calculator calculates the average value for each reflective face among the periods of a most recent one rotation of the polygonal mirror by excluding the maximum and minimum values among detected periods of each reflective face. The aforesaid controller controls the rotational speed of the polygonal mirror based on said average value.

The newest period of the reflective face detected by the photoreceptor is equivalent to a standard when calculating the newest period of the one rotation. The standard when calculating the newest period of one rotation is equivalent to the newest period detected by said photoreceptor for a predetermined single reflective face of the polygonal mirror.

The controller adjusts the rotational speed of the polygonal mirror based on the period of each reflective face until the rotational speed of the polygonal mirror attains a predetermined speed.

These and other objects and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 7 is another subroutine of the process of controlling the rotational speed of the polygonal mirror based on the period of one rotation of the polygonal mirror;

FIG. 8 is another subroutine of the process of calculating the period of one rotation of the polygonal mirror;

FIGS. 10A—10D show conventional construction and time charts in absence of and in the presence of dispersion of the reflective faces;

DETAILED DESCRIPTION OF THE PREFERRED EMBODIMENTS

The preferred embodiment of the present invention is described hereinafter with reference to the accompanying drawings.

Figure 1:
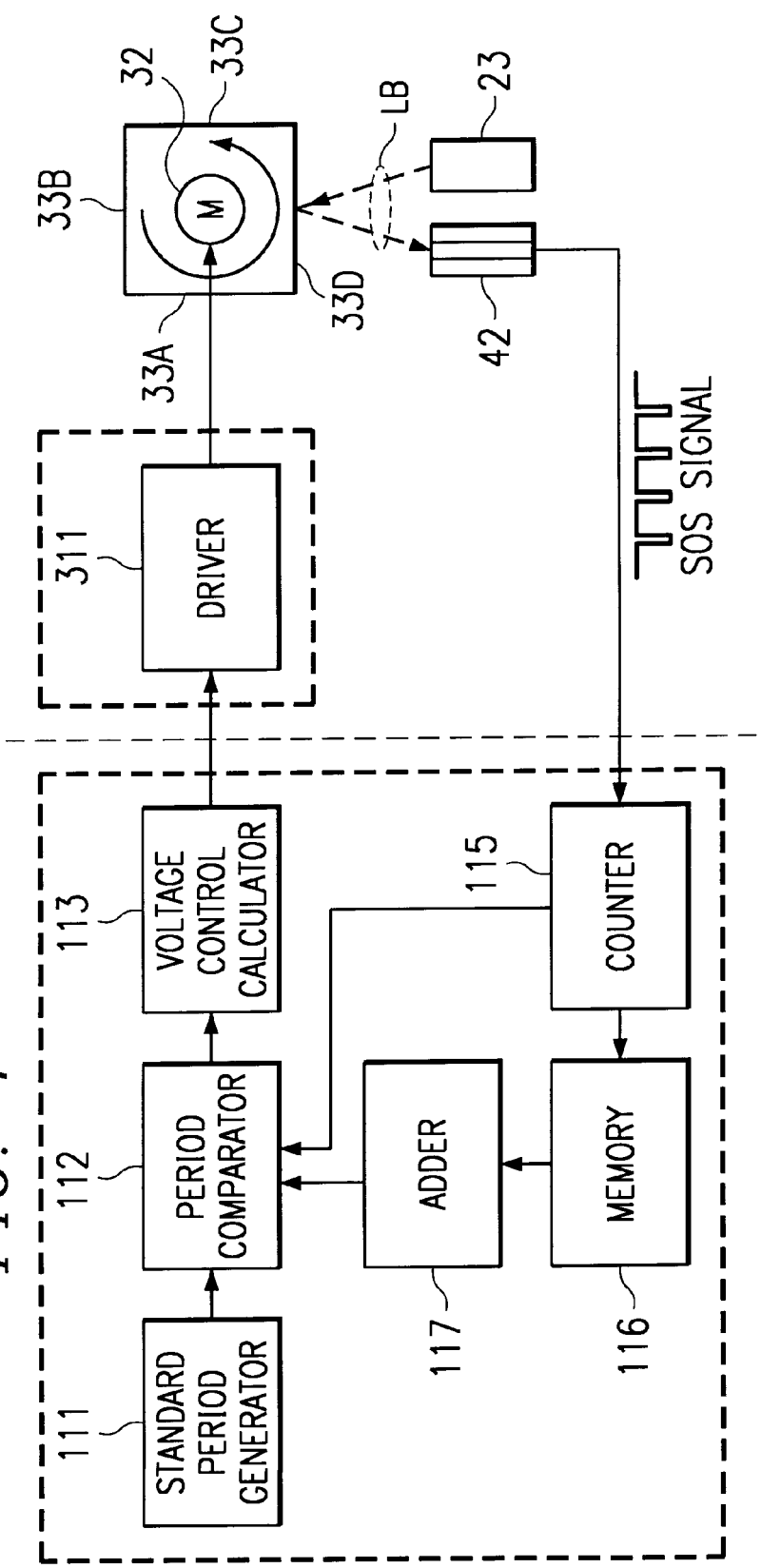
FIG. 1 is a block diagram of a circuit controlling the rotational speed of a polygonal mirror.

FIG. 1 is a block diagram of a circuit controlling the rotational speed of a polygonal mirror in an image forming apparatus of the present invention. In this apparatus, a photoconductive member (not illustrated) rotating at uniform speed in the sub-scanning direction is scanned in a main scanning direction by an image-forming laser beam LB, outputted from laser diode 23, reflected by a reflective face (one among reflective faces 33A through 33D) of a polygonal mirror 33 rotated in the arrow direction by a drive motor 32 so as to form an electrostatic latent image on the charged surface of said photoconductive member.

Image data corresponding to the aforesaid electrostatic latent image, e.g., data read from a mass storage member such as a CD-ROM or the like, is read by an image scanner or input via a communications circuit to a drive data generating circuit. An image-forming laser beam LB modulated by said image data is output toward polygonal mirror 33 by driving a laser diode 23 in accordance with said drive data.

In this apparatus, a forced laser beam unrelated to image data is output before the image-forming laser beam is emitted so as to control the emission timing of the image-forming laser beam. An SOS sensor 42 is provided at a position directly before the start of the main scanning in the vicinity of the photoconductive member. The output start timing of the image-forming laser beam is controlled for each main scanning line and the rotational speed of drive motor 32 is controlled in accordance with the timing of the detection of the forced laser beam by SOS sensor 42.

The speed control of drive motor 32 used to rotate polygonal mirror 33 is described below with reference to FIGS. 1 through 8.

Figure 2:
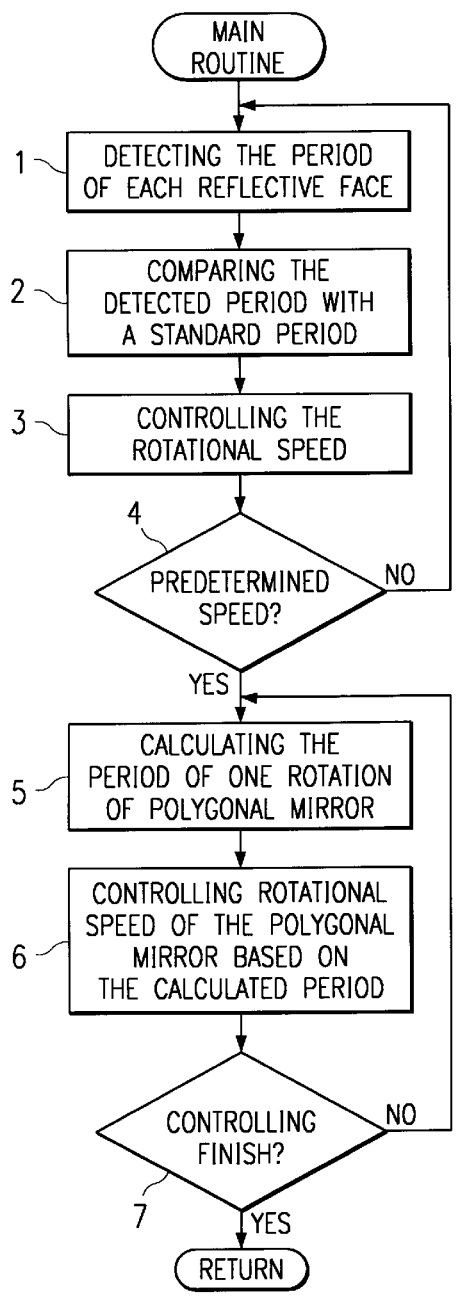
FIG. 2 is a flow-chart showing the process of controlling the rotational speed.

When the apparatus starts and until the rotational speed of drive motor 32 attains a predetermined speed (constant speed), the speed of drive motor 32 is controlled based on comparison of period detected for each reflective face to a standard period by a method similar to that used conventionally (#1 through #4 in FIG. 2).

Specifically, a forced laser beam is reflected by a reflective face (one among reflective faces 33A through 33D) of polygonal mirror 33 and detected by SOS sensor 42 which outputs an SOS signal as shown in FIG. 1.

The SOS signal output from SOS sensor 42 is input to counter 115, which counts the period of a single face. The period of single face is the period from the transition from the falling edge of the SOS signal to the transition to the next falling edge. As a specific example, the period is the time from the moment SOS sensor 42 detects a laser beam reflected by reflective face 33A of polygonal mirror 33 until SOS sensor 42 detects a laser beam reflected by the next reflective face 33B.

The period of each reflective face counted by counter 115 is sequentially input into a period comparator 112 until the rotational speed of drive motor 32 attains a constant speed. The period comparator 112 is provided with a standard period T from standard period generator 111 to adjust the drive motor 32 to a desired speed, and compares the period A of each reflective face with said standard period T. A voltage control calculator 113 calculates the voltage to drive the drive motor 32 in accordance with the aforesaid comparison result, and this voltage is provided to driver 311 to make the standard period T and the desired rotation time of one reflective face identical.

On the other hand, when the rotational speed of drive motor 32 attains a-constant speed (#4: YES in FIG. 2), control of the rotational speed of drive motor 32 is changed so as to adjust the rotation speed of drive motor 32 based on the period of one rotation of polygonal mirror 33.

The calculation of the period of one rotation of polygonal mirror (#5 in FIG. 2 and FIG. 3) is described below.

Figure 3:
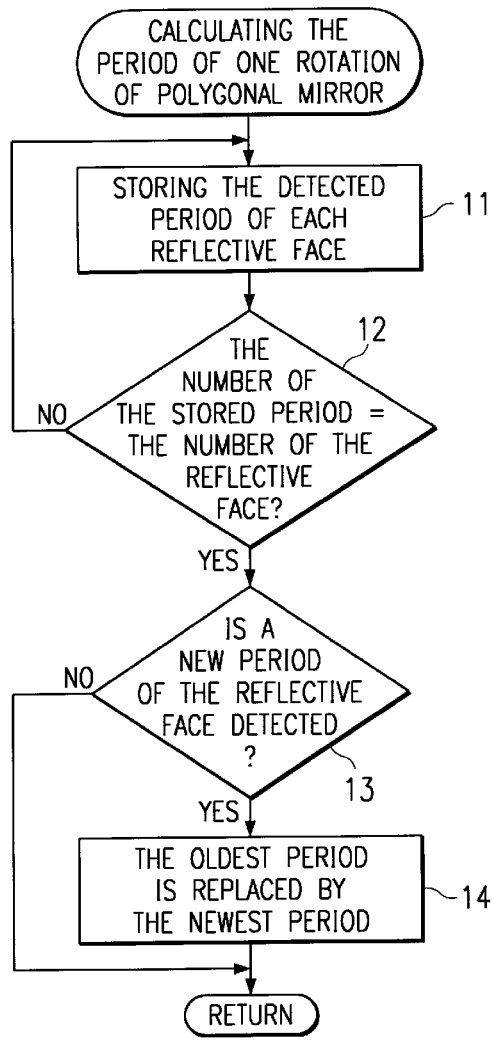
FIG. 3 is a subroutine of the process of calculating the period of one rotation of the polygonal mirror.

As shown in FIG. 3, the result of the count by counter 115 which is equivalent to the detected period of each reflective face is stored in memory 116 (#11). The period of each reflective face stored in memory 116 is added to calculate the sum of the periods corresponding to the number of the reflective faces of the polygonal mirror in adder 117 (#12). When the period of a new reflective face is detected in conjunction with the rotation of the polygonal mirror (#13), the oldest period is replaced by the newest period among the calculated sum value (#14). That is, in steps #13 and #14, the newest period of one rotation is determined. Even when a polygonal mirror comprises four faces as shown in FIG. 10, the newest period of one rotation is one among [A+B+C+D], [B+C+D+A], [C+D+A+B] or [D+A+B+C] when the newest period among the periods of reflective faces 33A through 33D are expressed by the symbols A through D. For example, [A] is the period A(k) to B(k).

In FIG. 3, the period of the newest one rotation detected by SOS sensor 42 is a standard interval which standardizes the newest one rotation of polygonal mirror 33.

The rotational speed of drive motor 32 is controlled based on the periods (sum value) of one rotation of polygonal mirror 33 calculated as described above (refer to step #6 of FIG. 2 and FIG. 4). The control of the rotational speed of drive motor 32 is described below with reference to FIG. 4.

A value VT is calculated by multiplying the standard period T by the number of reflective faces (#21). That is, this value VT is equivalent to a standard period of one rotation of the polygonal mirror. This value VT is compared with the period of one rotation calculated by the subroutine of FIG. 3 (#22), and the rotational speed of drive motor 32 is adjusted based on the comparison result (#23). The number of reflective faces in step #21 is [4] when polygonal mirror 33 is a square prism shape, and is [6] when a regular hexagonal prism shaped polygonal mirror is used.

Figure 4:
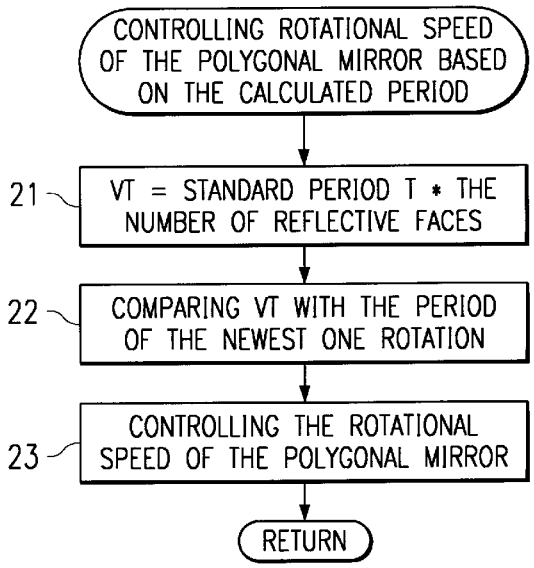
FIG. 4 is a subroutine of the process of controlling the rotational speed of the polygonal mirror based on the period of one rotation of the polygonal mirror.
Figure 5:
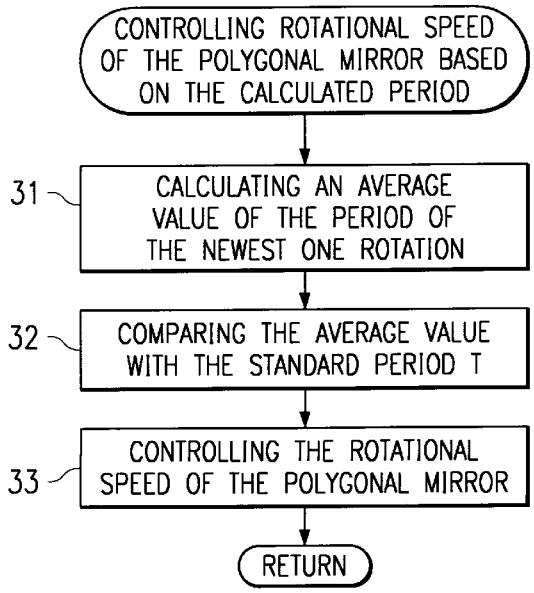
FIG. 5 is another subroutine of the process of controlling the rotational speed of the polygonal mirror based on the period of one rotation of the polygonal mirror.

Alternatively to FIG. 4, the average value of the sum of periods of each reflective face may be determined excluding the number of reflective faces (#31), and comparing said average value with a standard period (#32), and adjusting the rotational speed of drive motor 32 based on the comparison result (#33), as shown in FIG. 5.

Figure 6:
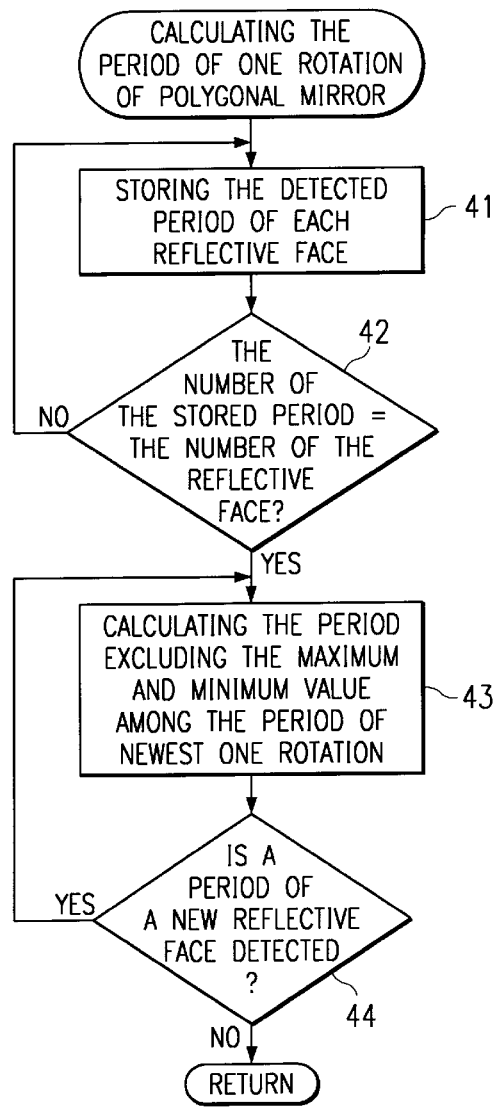
FIG. 6 is another subroutine of the process of calculating the period of one rotation of the polygonal mirror.
Figure 9:
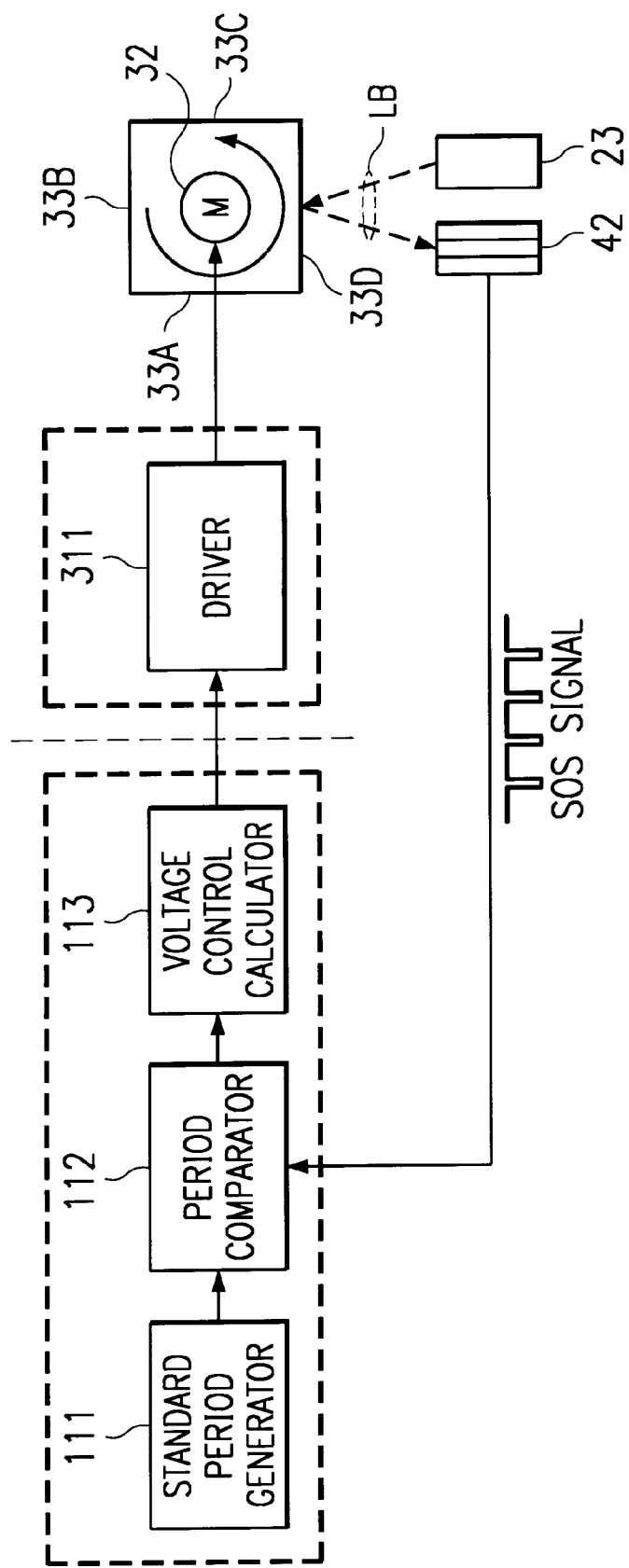
FIG. 9 is a block diagram of a conventional circuit controlling the rotational speed of a polygonal mirror.
Figure 11A:
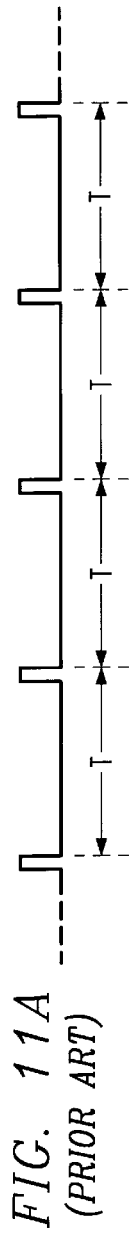
FIGS. 11A–11E are timing charts showing the problem points of the conventional method of controlling the rotational speed of a polygonal mirror.
Figure 11B:
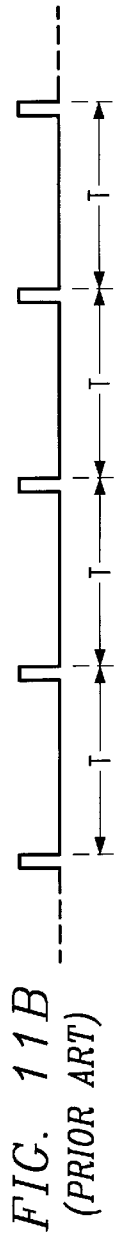
Figure 11C:
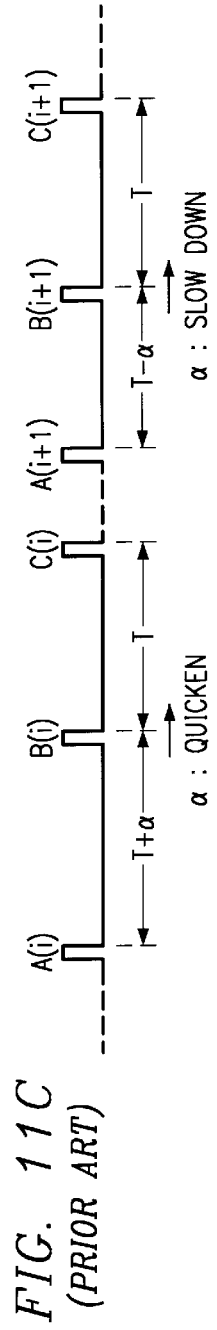
Figure 11D:
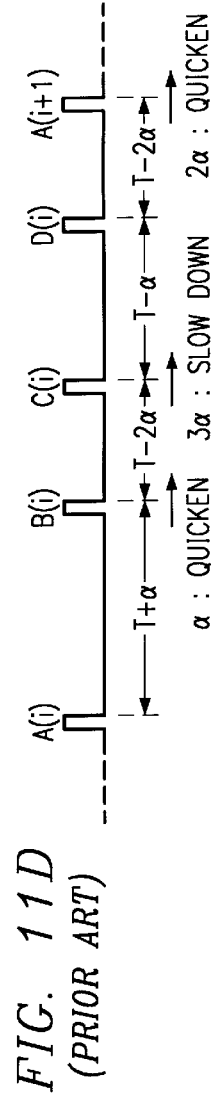
Figure 11E:
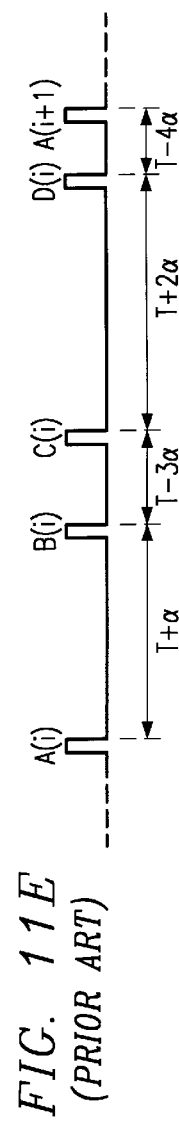

Furthermore, the value of the period may be calculated by excluding the maximum and minimum values among the detected periods of each reflective face (#43) instead of calculating the period of one rotation of the polygonal mirror, as shown in FIG. 6. In this instance, the calculated period must be compared to a value VT obtained by multiplying the standard period T by an numerical value two integers less than the number of reflective faces of the polygonal mirror (#51 and #52 in FIG. 7). For example, in the case of a square prism shaped polygonal mirror, the number of faces remaining after excluding the maximum and minimum values is [2], such that double the standard period T is used as the comparison value.

As shown in FIG. 8, the period detected for the newest one rotation for reflective face 33A may be used as a standard instead of using the newest period for the newest one rotation of polygonal mirror 33. In other words, the time of one rotation from the newest detection by SOS sensor 42 of reflective face 33A may be defined as the newest one rotation of polygonal mirror 33. Specifically, this time is equivalent to period A(k−1) to A(k) in FIG. 10C. In the above description, [k] represents the newest rotation when the reflective face 33A is used as the rotation measurement standard (i.e., when measuring the rotation starting from reflective face 33A).

The defined detection period in FIG. 8 is compared to a value VT calculated by multiplying a standard period T by the number of reflective faces, and adjusting the rotational speed of drive motor 32 based on the comparison result, as shown in FIG. 4.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus which outputs a light for image formation in accordance with image data, the apparatus comprising:

a light emitting unit which emits a forced light unrelated to image data so as to adjust an output timing of the light for image formation before outputting the light for image formation;

a reflective member having a plurality of reflective surfaces which reflect said forced light emitted from said light emitting unit while rotating;

a light receiving unit which receives the forced light reflected by said reflective surfaces;

a counter which counts a time, between starting and completing, during which said light receiving unit receives said forced light reflected by a predetermined reflective surface;

an adder which adds times counted by said counter for all reflective surfaces in accordance with a rotation of said reflective member; and a controller which controls a rotational speed of said reflective member based on the time added by said adder.

2. The image forming apparatus according to claim 1, wherein said reflective member corresponds to a polygonal mirror.

3. The image forming apparatus according to claim 1, wherein said light emitting unit corresponds to a laser diode which emits a laser beam.

4. The image forming apparatus according to claim 3, wherein said light receiving unit corresponds to a start-of-scan sensor which receives the laser beam emitted by said laser diode.

5. The image forming apparatus according to claim 1, wherein said adder replaces an oldest time among the added times with a new time when said counter counts the new time in accordance with the rotation of said reflective member.

6. An image forming apparatus which outputs a light for image formation in accordance with image data, the apparatus comprising:

- a light emitting unit which emits a forced light unrelated to image data so as to adjust an output timing of the light for image formation before outputting the light for image formation;
- a reflective member having a plurality of reflective surfaces which reflect said forced light emitted from said light emitting unit while rotating;
- a light receiving unit which receives the forced light reflected by said reflective surfaces;
- a counter which counts a time, between starting and completing, during which said light receiving unit receives said forced light reflected by a predetermined reflective surface;
- a calculator which calculates an average value for times counted by said counter for all reflective surfaces; and
- a controller which controls a rotational speed of said reflective member based on said average value.

7. The image forming apparatus according to claim 6, wherein said reflective member corresponds to a polygonal mirror.

8. The image forming apparatus according to claim 6, wherein said light emitting unit corresponds to a laser diode which emits a laser beam.

9. The image forming apparatus according to claim 8, wherein said light receiving unit corresponds to a start-of-scan sensor which receives the laser beam emitted by said laser diode.

10. An image forming apparatus which outputs a light for image formation in accordance with image data, the apparatus comprising:

- a light emitting unit which emits a forced light unrelated to image data so as to adjust an output timing of the light for image formation before outputting the light for image formation;
- a reflective member having a plurality of reflective surfaces which reflect said forced light emitted from said light emitting unit while rotating;
- a light receiving unit which receives the forced light reflected by said reflective faces;
- a counter which counts a time, between starting and completing, during which said light receiving unit receives said forced light reflected by a predetermined reflective surface;
- a calculator which excludes a maximum time and a minimum time from among times counted for all reflective faces and calculates an average value for all remaining times; and
- a controller which controls a rotational speed of said reflective member based on said average value.

11. The image forming apparatus according to claim 10, wherein said reflective member corresponds to a polygonal mirror.

12. The image forming apparatus according to claim 10, wherein said light emitting unit corresponds to a laser diode which emits a laser beam.

13. The image forming apparatus according to claim 12, wherein said light receiving unit corresponds to a start-of-scan sensor which receives the laser beam emitted by said laser diode.

14. An image forming apparatus which outputs a light for image formation in accordance with image data, the apparatus comprising:

- a light emitting unit which emits a forced light unrelated to image data so as to adjust an output timing of the light for image formation before outputting the light for image formation;
- a reflective member having a plurality of reflective surfaces which reflect said forced light emitted from said light emitting unit while rotating;
- a light receiving unit which receives the forced light reflected by said reflective surfaces;
- a counter which counts a time between when the light receiving unit receives said forced light reflected by a predetermined reflective surface and when the light receiving unit again receives said forced light reflected by the predetermined reflective surface after one rotation of said reflective member; and
- a controller which controls a rotational speed of-said reflective member based on the time counted by said counter.

15. The image forming apparatus according to claim 14, wherein said reflective member corresponds to a polygonal mirror.

16. The image forming apparatus according to claim 14, wherein said light emitting unit corresponds to a laser diode which emits a laser beam.

17. The image forming apparatus according to claim 16, wherein said light receiving unit corresponds to a start-of-scan sensor which receives the laser beam emitted by said laser diode.

18. A method of forming an image by outputting a light in accordance with image data, the method comprising the steps of:

- rotating a reflective member having a plurality of reflective surfaces;
- emitting a forced light unrelated to image data for said reflective member so as to adjust an output timing of the light for forming an image;
- receiving the forced light reflected by a predetermined reflective surface in accordance with rotation of said reflective member;
- counting a time between starting to receive said forced light reflected by said predetermined reflective surface and completion of the reflection of said forced light due to rotation of said reflective member;
- adding times counted for all reflective surface; and
- controlling a rotational speed of said reflective member based on the time added.

* * * * *